W. W. DRYDEN.
COFFEE MILL.
APPLICATION FILED SEPT. 19, 1908.
913,475.
Patented Feb. 23, 1909.
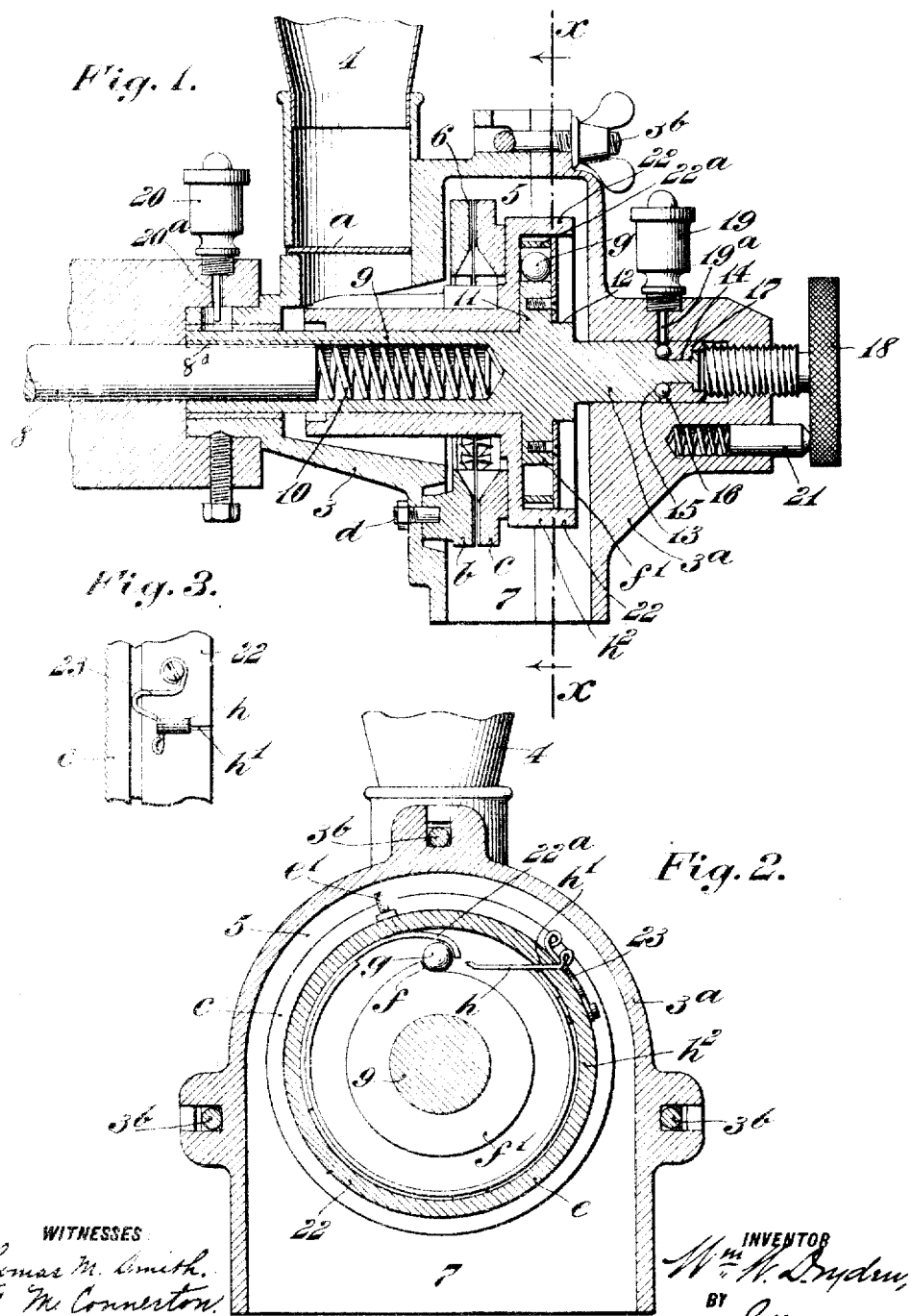
WITNESSES
Thomas M. Smith
G. M. Connerton
INVENTOR
Wm. W. Dryden
BY
J. Walter Douglas
ATTORNEY.

UNITED STATES PATENT OFFICE.

WILLIAM W. DRYDEN, OF PHILADELPHIA, PENNSYLVANIA, ASSIGNOR TO CHARLES E. TROEMNER, OF PHILADELPHIA, PENNSYLVANIA.

COFFEE-MILL.

No. 913,475.   Specification of Letters Patent.   Patented Feb. 23, 1909.

Application filed September 19, 1908.   Serial No. 453,803.

*To all whom it may concern:*

Be it known that I, WILLIAM W. DRYDEN, a citizen of the United States, residing at the city of Philadelphia, in the county of Philadelphia and State of Pennsylvania, have invented certain new and useful Improvements in Coffee-Mills, of which the following is a specification.

My invention relates to means operating to automatically disengage the grinding mechanism of a coffee or similar mill, when foreign matter, such as nails, sticks or the like contact with working faces of fixed and movable members of the said grinding-mechanism of the mill to interfere with uniform workings thereof.

The nature and scope of my said invention will be more fully understood from the following description taken in connection with the accompanying drawings forming part hereof, in which—

Figure 1, is a vertical longitudinal sectional view of a power operated coffee mill having a driven shaft and means for automatically disengaging the grinding-mechanism of the mill when matter foreign to that to be ground contacts with the working faces of the said mechanism, the said means embodying main features of my present invention. Fig. 2, is a vertical sectional view on the line $x$, $x$, of Fig. 1, showing the detail arrangement of said automatic means for the defined purpose; and Fig. 3, is a detail view of a locking means for a finger of the said means for automatically disengaging the said grinding mechanism.

Referring to the drawings 3 and $3^a$, represent sectional casings housing working parts of an ordinary power operated coffee mill.

4, is the feed hopper provided therein, with a slide $a$. The hopper 4, merges into a chamber 5, in which is placed grinding means 6, preferably, consisting of two toothed disks $b$ and $c$, facing each other as shown in Fig. 1. One of the tooth disks $b$, of the said grinding means is fixed to the casing 3, by means of bolts or other fastening means $d$, while the other disk $c$, is detachably mounted on a rotary member of the mill. From the inclined and straight walls of the main grinding chamber 5, and extending downward is an outlet throat 7.

8, is a driven shaft adapted to be operated from an electric or other motor, not shown. The shaft 8, is splined at $8^a$, to a sleeve 9, and at one end bears against a coiled spring 10, mounted in the said sleeve. The sleeve 9, is offset at 11, and shouldered at 12, and formed into an extension 13, to form a bearing which is mounted in a removable casing $3^a$. The end of the bearing 13, is recessed to form a flanged end 14, and around the offset portion 15, of which are arranged balls 16, held to place, by means of a recessed gasket 17, as clearly illustrated in Fig. 1.

18, is a jam-nut arranged to engage the flanged end of the bearing 13, to tighten said bearing and also the sleeve 9, on the shaft 8, under the tension of the spring 10.

19 and 20, are oil distributing devices having pipes $19^a$ and $20^a$, extending through the casings 3 and $3^a$, for keeping the sleeve 9, splined to the shaft 8, properly lubricated and also the ball bearings 16, in working condition.

21, is a spring tension pin arranged so as to enter one of a series of openings intended to be provided on the inner side of the head of the jam-nut 18.

$22^a$, is a leaf spring secured to the rim $e$, of the outer sleeve 22, held in frictional contact with the sleeve 9, as illustrated in Fig. 2. This spring $22^a$, at its free portion is bent outward into a curved end and arranged so as to be held more or less firmly, by a set screw $e^1$, extending through the rim $e$. The offset portion of the sleeve 9, is formed into a cam-shape boss $f^1$, having a recess $f$, to engage a ball $g$, to hold the same therein, aided by the extension of the free extremity of the spring $22^a$, which tension is maintained by the position of the set screw $e^1$, in contact with the spring. $h$, is an upturned finger extending through a slit $h^1$, in the rim $e$, and adapted to be shifted back and forth to receive and release the ball $g$, as required. By the contact of foreign matter between the fixed and movable toothed or abrading members $b$ and $c$, of the grinding mechanism 6, of the mill, the disk $c$, is caused to run free with the driven shaft 8, splined to the sleeve 9, after the ball $g$, has been cast onto the inwardly extended finger $h$, by the spring locking device 23, holding the said finger $h$, in an operative position, as shown in Figs. 2 and 3, by contacting with the outer end of the finger beyond the rim $e$. At the same time the upturned inner end of the said finger $h$, will occupy such a position within the rim $e$, as to enable the nose of the recessed boss $f^1$, to clear the said end of the finger carrying the ball g, the sleeve 9, revolving said boss by means of the driven shaft 8, as will be understood from Figs. 1 and 2. The locking device 23, bearing with a spring like effect against the enlarged outer end of the finger h, coupled with the slit h¹, holds it frictionally against the respective walls thereof, as clearly illustrated in Fig. 2. The normal position of the finger h, to receive the said ball g, from the recess f, of the boss f¹, is that shown in Fig. 2.

If foreign matter is carried into the grinding means with coffee or the like to be ground tending to clog up or interfere with the normal working of the grinding means of the mill at once the undue friction brought to bear will cause the inner sleeve 9, to turn to such an extent as to overcome the tension of the spring 22ª, holding the ball g, in the recess f, of the boss f¹, and hence to cast it onto the finger h, when in the position as shown in Fig. 2. The driven shaft 8, splined to the sleeve 9, will by the foregoing action continue to revolve, but the disk c, of the grinding means will be rendered inoperative with respect to the fixed disk b, of the said means, in the casing 3. By stopping the mill and removing the detachable casing 3ª, by means of the lock-nuts 3ᵇ, as fully illustrated in Fig. 2, and moving the spring finger h, outward, away from the engagement of the locking device 23, the ball g, will be released from its engagement with the said finger h, and can then travel around so as to take into the recess f, of the boss f¹, of the sleeve 9, under the tension of the leaf spring 22ª, to hold it again in a position corresponding with that illustrated in Fig. 2.

By permitting the grinding members b and c, of the said grinding mechanism 6, of the mill to become inoperative, as above explained, the teeth of the respective members of the said grinding mechanism can be preserved from the damaging influences of foreign matter almost indefinitely, because invariably the grindings in such mills are constantly subject to the effects of foreign matter, tending to destroy unduly the reliable workings of the mill.

Having thus described the nature and object of my invention, what I claim as new and desire to secure by Letters Patent is:—

1. In a coffee mill, means to automatically disengage grinding means of the mill, comprising a rotatable member carrying a rotary part of said grinding means, said member provided with a recessed-end, a ball adapted to engage said recessed end, a spring for normally holding said ball in the recessed end of said rotatable member and means to receive and hold said ball when released from the recessed end of said rotatable member, substantially as and for the purposes described.

2. In a coffee mill, means to automatically disengage grinding means of the mill, comprising a rotatable member carrying a rotary part of said grinding means, said member provided with a recessed boss, a flat spring located in proximity to said boss, a ball held in the recess of said boss under the influence of said spring, means for increasing or decreasing the normal tension of said spring against said ball in the recess of said boss and a shiftable means for receiving said ball when released from the tension under which it is held by said spring in the recess of said boss, substantially as and for the purposes described.

In witness whereof, I have hereunto set my signature in the presence of two subscribing witnesses.

WILLIAM W. DRYDEN.

Witnesses:
 J. WALTER DOUGLASS,
 THOMAS M. SMITH